United States Patent [19]

Scheide et al.

[11] Patent Number: 4,704,289

[45] Date of Patent: Nov. 3, 1987

[54] PROCESS FOR THE EXTRACTION OF PROTEIN FROM SOY FLOUR

[75] Inventors: Jurgen D. Scheide, Summit; Karl E. Brand, Holmdel, both of N.J.

[73] Assignee: General Spice, Inc., South Plainfield, N.J.

[21] Appl. No.: 665,950

[22] Filed: Oct. 29, 1984

[51] Int. Cl.$^4$ .............................................. A23J 1/14
[52] U.S. Cl. ...................................... 426/431; 426/634
[58] Field of Search ...................... 426/425, 431, 634; 260/123.5

[56] References Cited

U.S. PATENT DOCUMENTS

| | | | |
|---|---|---|---|
| 2,052,215 | 8/1936 | Cohn | 426/431 |
| 2,881,076 | 4/1959 | Sair | 426/431 |
| 3,669,677 | 6/1972 | Sair et al. | 426/431 |
| 4,079,155 | 3/1978 | Kakade | 426/431 |
| 4,138,506 | 2/1979 | Eida et al. | 426/431 X |
| 4,151,310 | 4/1979 | Mattil et al. | 426/431 |
| 4,410,554 | 10/1983 | Sailer | 426/431 X |

*Primary Examiner*—R. B. Penland
*Attorney, Agent, or Firm*—Kenyon & Kenyon

[57] ABSTRACT

A method for extracting soy protein from soy flour is provided. Soy flour is added to acidified water so that, immediately upon addition of the soy flour, the water will be in the iso-electric range of soy protein and the soy protein will be usable to enter solution but the soluble fraction of the soy flour will enter solution.

7 Claims, 1 Drawing Figure

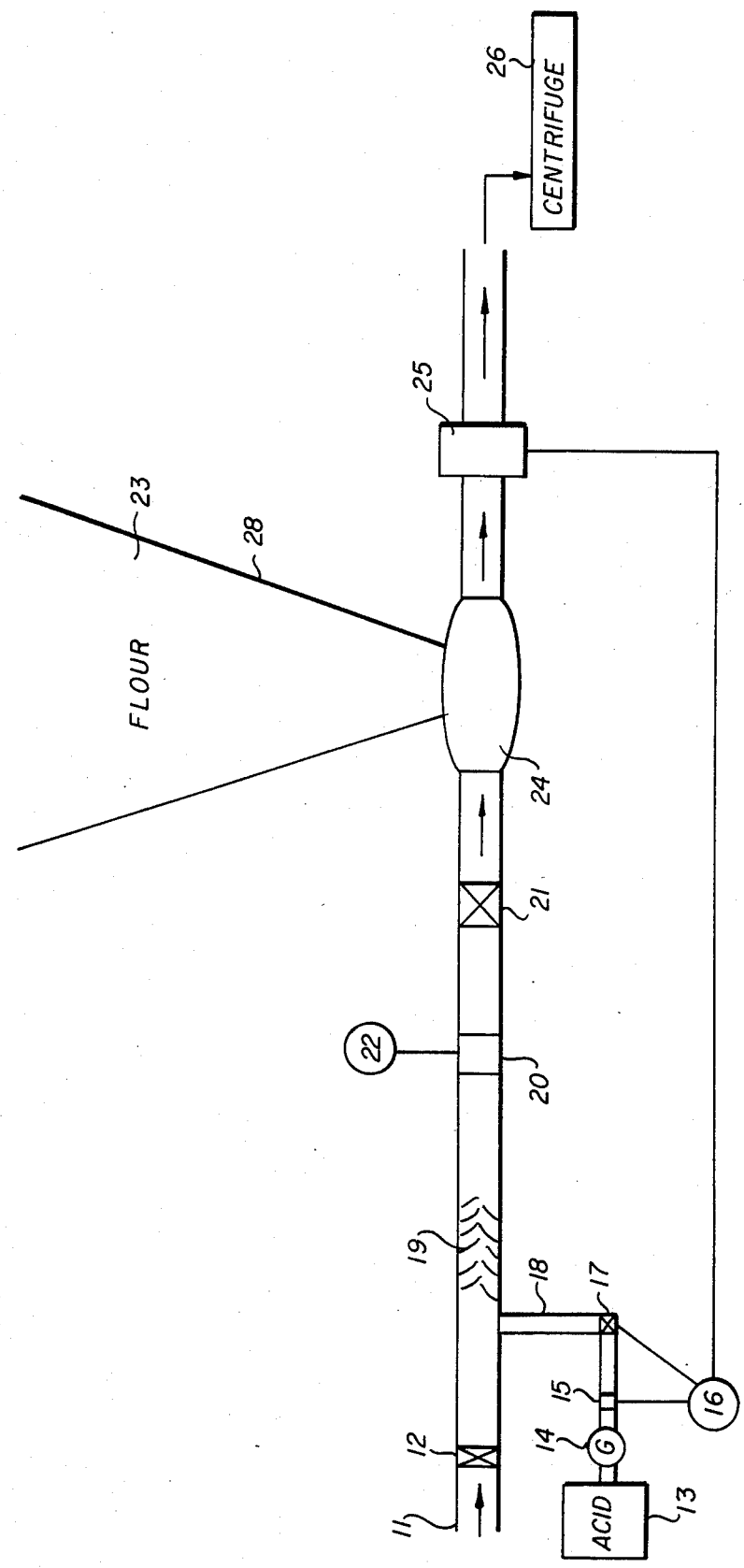

PROCESS FOR THE EXTRACTION OF PROTEIN FROM SOY FLOUR

BACKGROUND OF THE INVENTION

This invention relates to the processing of soy flour. Specifically, the invention is a process for the treatment of soy flour to obtain a soy flour protein concentrate.

Soybeans are widely cultivated and are known to be an excellent source of relatively inexpensive high-quality proteins. Soybean protein is often concentrated or extracted from soybeans and used in a variety of food products. This is generally done by milling the soybeans and removing the naturally occurring soybean oils to give a soy flour. This flour is then subjected to a treatment process to produce a soy protein concentrate.

Soy flour treatment processes fall into two general categories: The aqueous extraction methods and the nonaqueous extraction methods.

The non-aqueous methods rely upon organic solvents in order to separate the protein component from the nonprotein component. Organic solvents have an undesirable effect upon the protein. Most notably, they cause serious denaturation of the proteln as measured by the Nitrogen Solubility Index (NSI) (American Oil Chemist's Method Ba 11-65).

Highly denatured proteins are characterized by very low NSI's, often as low as 5. Denatured proteins have many undesirable properties including poor heat gelability, water binding and heat coagulation. These proteins also have diminished emulsifying capabilities and are less palatable than undenatured proteins.

Aqueous extraction techniques generally result in protein products which have a NSI of at least 65. Soy protein extracts having an NSI of 65 or higher are quite palatable and have good heat gelability, water binding and heat coagulation properties.

The aqueous extraction teohniques are generally based on the work of Sair as illustrated in his U.S. Pat. No. 2,881,076 and are also known as "acid-leach" methods.

The aqueous methods take advantage of the insolubility in water at their iso-electric point of the glycinin proteins which are found in soy flour. Typically, an aqueous suspension of soy flour is brought to a pH of about 4.0 to 4.8 (the iso-electric range of the glycinin soy protein) and the insoluble protein is precipitated while a large portion of the soy flour remains ln solution. The protein-rich precipitate can then be separated from the supernatant, yielding a high-quality protein concentrate.

The various acid-leach methods which have been known in the past suffer from a variety of process drawbacks. Most notably, they require large, specially constructed holding or mixing tanks. Usually, these extractions are conducted in a batch-type sequence. In these cases, the soy flour, the water and the acidifying agent are mixed in stainless steel or glass-lined tanks which are acid resistant and suitable for food handling.

The batch procedures have been used for a number of reasons. One of the most important of these reasons is to allow for thorough mixing of the soy flour and water before and during acidification. Without vigorous mixing, an unworkable soy flour paste will be formed when a large quantity of soy flour is added at once to water. Also, during acidification, the soy protein acts as a strong buffer and will result in significant local variations in pH unless strong agitation is provided. These local variations in pH can cause incomplete separation of the protein component from the non-protein component, as well as partial denaturation of the protein. When these processes are conducted on a commercial scale, these stainless steel or glass lined mixing tanks must be quite large. In fact, tanks capable of holding tens of thousands of gallons of solution are often needed.

The size of the stainless steel or glass lined tanks used in aqueous soy protein extraction systems poses serious problems. First, tanks of this type are expensive to construct and maintain. Thus, the large tanks used in aqueous extractions represent a formidable capital outlay. Second, tanks of this size are difficult to house and require the construction of large plant structures. These structures also represent large capital expenditures.

Another significant drawback of the previously known aqueous extraction technologies is the time required to complete the protein extraction process. The basic Sair process, as described in U.S. Pat. No. 2,881,076, requires approximately 27 hours to process a single batch of soy flour. Such delays are not only undesirable from an economic standpoint, but are also known to result in a diminution of protein quality.

One recent attempt to solve the problems associated with aqueous soy protein extractions is the work of Sailer as described in U.S. Pat. No. 4,410,554. Sailer shows that by the use of certain procedures, a semi-continuous extraction process which has a pass-through time of no more than one hour can be achieved. However, Sailer still requires several large holding tanks, preferably two 10,000 gallon tanks one 3,000 gallon tank and six 1,000 gallon tanks. Each tank must have a powerful agitator.

SUMMARY OF THE INVENTION

It is therefore an object of this invention to provide an improved method for extracting protein from soy flour which does not require the use of large tanks, agitator and other expensive apparatus.

It is also an object of this invention to provide an improved method for extracting protein from soy flour which is continuous in nature and which may be executed within a relatively short time.

It is yet another object of this invention to provide a method for the extraction of protein from soy flour which results in a soy protein concentrate of superior quality as indicated by a high Nitrogen Solubility Index.

Other objects and advantages of the present invention will become apparent to those skilled in the art upon reading this disclosure and the appended claims in their entirety.

According to the present invention soy flour is added to acidified water in such a manner that, immediately upon the addition of the soy flour, the water will be at the iso-electric range of the soy glycinin protein (pH 4.0-4.8) and the soy protein will be unable to enter solution but the soluble fraction of the soy flour will enter solution. The resulting mixture can then be immediately centrifuged to separate the protein-rich precipitate from the supernatant to give a high-quality soy protein concentrate.

DETAILED DESCRIPTION OF THE INVENTION

In the process of the present invention, the water is pre-mixed with enough acid to (1) overcome the buffering capacity of the glycinin proteins which will eventually be added to the water and (2) to bring the pH of the water-flour mixture to about 4.0 to 4.8. Preferably the final pH is 4.3 to 4.8 and optimally is about 4.5.

The acidified water and soy flour are mixed in a ratio and at a flow rate which is adapted to provide thorough and extremely rapid mixing of the soy flour and acidified water so that the mixture will reach the desired pH almost instantaneously.

The amount of acid to be used is dependent upon the volume of water, the amount of soy protein, and suprisingly, the particular acid used. It has been found that from about 250 to about 260 millimoles of HCl per pound of dry soy flour is required to overcome the buffering capacity of the soy flour protein. However, from about 260 to about 270 millimoles of $H_3PO_4$ is required to achieve the same effect. This effect is most surprising. Phosphoric acid is known to be a far weaker acid than hydrochloric acid and it would be expected that far more phosphoric acid per lb. of soy flour would be needed. However, this is not the case. Thus, when $H_3PO_4$ is used as an acidifying agent, the soy flour is mixed with an extraction solution that has a significantly higher pH than when HCl is used as an acidifying agent.

It will, of course, be appreciated that, in addition to the above-mentioned amount of acid, there must also be added enough acid to bring the volume of water used in the extraction to the desired pH (preferably 4.5) in the absence of the added soy protein. This is usually a relatively small amount of acid. When HCl is used, and the water and soy flour are mixed in a weight ratio of 5 to 1, an additional $3.16 \times 10^{-2}$ millimoles of additional acid is used per pound of flour and when the ratio is 10 to 1, an additional $6.32 \times 10^{-2}$ millimoles are added. Similarly, when $H_3PO_4$ is the acidifying agent and a 5 to 1 ratio of water to soy flour is used an additional 4.21 millimoles is added to acidify the water, and 8.42 millimoles of additional $H_3PO_4$ is added when this ratio is 10 to 1.

It has been discovered that from 5 to 10 grams of water per gram of soy flour give good results in the present process and that about 8 grams of water per gram of soy flour is preferred.

It has been found that the flow rate of the acidified water which is used in this invention should be from about 15 to about 40 gal/min. Preferably, the flow rate is in the range of about 30 to 35 gal/min. The soy flour is added to the acidified water at a rate which is adapted to mix the water and flour in the above mentioned weight ratios. It will, of course, be appreciated that this rate of flour addition is entirely determined by the above mentioned acidified water flow rate and water soy flour ratios.

This invention will now be described in detail by referring to the drawing FIGURE and with the aid of examples. The drawing and examples are intended to be illustrative only and are not meant to limit the scope of the invention.

Referring now to the drawing FIGURE, the process of the present inventions is begun when water is introduced into pipe 11. The flow rate of the water entering pipe 11 is controlled by a valve 12. The valve 12 is made of a material suitable for food processing equipment, such as polypropylene.

Acid is then introduced into pipe 11 from acid container 13. The acid is introduced through conduit 18 by a pump 14. A flow meter 15 monitors the rate at which acid is pumped into conduit 18 and a valve 17 is used to regulate the acid flow. Controller 16 regulates valve 17, in part on the data supplied by flow meter 15. The acid is thoroughly mixed with the water in pipe 11 as both pass through a short section of baffles 19 in pipe 11.

The mixed, acidified water in pipe 11 then passes through a flow meter 20 and a valve 21 in pipe 11. The flow of acidified water through valve 21 is controlled by controller 22 on the basis of data supplied by flowmeter 20. The acidified water then enters the soy flour mixing section 24 of pipe 11.

In section 24, dry soy flour from container 28 is introduced by a feeding means 23. The rate of soy flour introduction and the flow rate of acidified water are carefully matched in accordance with the principles of the present invention. The soluble fraction of the soy flour instantly enters solution but the soy protein precipitates, never having been able to go into solution.

The soy flour/water mixture then exits pipe 11 and enters centrifuge 26 for separation of the supernatant from the protein-rich preciptate. As the water/soy mixture leaves pipe 11, its pH is monitored by pH monitor 25. The pH control 25, supplies data to controller 16 to cause an increase or decrease in the amount of acid introduced into pipe 11. This step allows the system to account for variations in the protein content of the flour, the strength of the stock acid solutions, the hygroscopic moisture of the flour and other factors.

EXAMPLE 1

An acid leach extraction was conducted using an apparatus similar to that represented in FIG. 1. Two hundred fifty gallons of water were introduced to the system at a flow rate of about 15 gallons per minute. Hydrochloric acid was continuously added to the water to create a 0.276% HCl solution. To this system was added 312 lbs of soy flour (approx 50% protein by weight) at a constant rate of 18.7 lbs/minute. The resulting soy/water mixture had a pH of about 4.4. The mixture was then placed in a decanting centrifuge. The effluent was found to be composed of only 0.45% protein. The wet cake yielded a protein concentrate with an NSI of 69. The extraction process was carried out at a rate of 0.5 minutes per pound of flour.

EXAMPLE 2

An extraction was performed using an apparatus such as was used in Example 1. 2.72 kg. of water was introduced to the system at a flow rate of 23.9 gallons per minute. A 20% phosphoric acid solution was continuously added to the water to create a 0.91% $H_3PO_4$ solution. To this system was added 500 g. of soy flour (approximately 50% protein by weight) at a constant rate of 32.4 lbs./minute. The resulting soy/water mixture had a pH of about 4.4. The mixture was then placed in a decanting centrifuge. The effluent was found to be composed of only 0.7% protein. The wet cake yielded a protein concentrate with an NSI of 67.

What is claimed is:
1. A method for the continuous extraction of protein from soy flour comprising the steps of:
  acidifying a volume of water, then adding soy flour to the acidified water, causing a protein-containing fraction to form in the acidified water, and then separating the protein-containing fraction from the acidified water wherein sufficient amounts of water and acid are used that the resultant water/soy mix- ture will immediately reach a pH of from about 4.0 to about 4.8.

2. The method of claim 1 wherein the acidified water and soy flour are mixed in a weight ratio of from about 5:1 to about 10:1 and said pH is from about 4.0 to about 4.5.

3. The method of claim 2 wherein said ratio is 8:1 and said pH is from about 4.3 to about 4.5.

4. The method of claim 2 wherein said acid is HCl and wherein from about 250 to about 260 millimoles of said acid is used per pound of soy flour.

5. The method of claim 3 wherein said acid is HCl and wherein from about 250 to about 260 millimoles of said acid is used per pound of soy flour.

6. The method of claim 2 wherein said acid is $H_3PO_4$ and wherein from about 260 to about 270 millimoles of said acid is used per pound of soy flour.

7. The method of claim 3 wherein said acid is $H_3PO_4$ and wherein from about 260 to about 270 millimoles of said acid is used per pound of soy flour.

* * * * *